US009483890B2

(12) United States Patent
Dawber et al.

(10) Patent No.: US 9,483,890 B2
(45) Date of Patent: *Nov. 1, 2016

(54) SECURITY APPARATUS

(71) Applicant: Farpointe Data, Inc., Sunnyvale, CA (US)

(72) Inventors: Fred Dawber, Burlington (CA); Richard Sipura, Georgetown (CA)

(73) Assignee: Farpointe Data, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,048

(22) Filed: Mar. 10, 2015

(65) Prior Publication Data

US 2015/0248800 A1 Sep. 3, 2015

Related U.S. Application Data

(63) Continuation of application No. 12/959,691, filed on Dec. 3, 2010, now Pat. No. 8,973,823.

(60) Provisional application No. 61/266,782, filed on Dec. 4, 2009, provisional application No. 61/286,526, filed on Dec. 15, 2009.

(51) Int. Cl.
*G06K 5/00* (2006.01)
*G07C 9/00* (2006.01)

(52) U.S. Cl.
CPC ....... *G07C 9/00182* (2013.01); *G07C 9/00944* (2013.01)

(58) Field of Classification Search
CPC ...... E05C 19/166; E05C 19/16; E05C 17/56; E05C 19/168; E05B 65/108; E05B 17/22; E05B 45/06; E05B 43/00; E05B 47/02; E05B 2047/0058; E05B 2047/0067; E05B 2047/0068; E05B 2047/0094; E05B 47/00; E05B 47/0603; E05B 47/0692; E05B 63/16; E05B 65/1046; E05B 65/44; E05G 1/04; G07C 9/00103; G07C 2009/00634; G07C 9/00158; G07C 9/00166; G07C 9/00571; G07C 9/00674; G07C 1/32; G07C 2009/002
See application file for complete search history.

(56) References Cited

U.S. PATENT DOCUMENTS 3,751,086 A 8/1973 Geringer
6,053,546 A 4/2000 Frolov (Continued)

FOREIGN PATENT DOCUMENTS

JP 2007-107325 A 4/2007

OTHER PUBLICATIONS

Office Action in U.S. Appl. No. 12/959,691, mailed Nov. 28, 2012.

(Continued)

*Primary Examiner* — Thien T Mai
(74) *Attorney, Agent, or Firm* — Nixon Peabody LLP

(57) ABSTRACT

Disclosed is apparatus for use with an RFID proximity card and with a steel door and frame assembly. The door is of the type having a magnet and the frame is of the type having a bore, which, when the door is closed in the frame, presents towards the magnet. The bore is of the type provided to permit the mounting of a magnetic door contact in the frame. The apparatus comprises a sensor assembly which: in use, is received by the bore and grippingly engages said frame; produces a first signal when the card is operatively presented thereto; and produces a second signal when the door is closed to bring the magnet adjacent the sensor assembly and into alignment with the bore.

20 Claims, 1 Drawing Sheet

(56) References Cited

U.S. PATENT DOCUMENTS

| | | | |
|---|---|---|---|
| 6,722,715 | B1 | 4/2004 | Chiang |
| 7,463,132 | B2 | 12/2008 | Deng et al. |
| 8,973,823 | B2 | 3/2015 | Dawber et al. |
| 2007/0057793 | A1 | 3/2007 | Alden |
| 2009/0025435 | A1 | 1/2009 | Popowski |
| 2012/0018512 | A1 | 1/2012 | Gressel et al. |
| 2014/0223831 | A1* | 8/2014 | Jones .................. E05B 17/2084 49/504 |

OTHER PUBLICATIONS

Office Action in U.S. Appl. No. 12/959,691, mailed May 22, 2013.
Office Action in U.S. Appl. No. 12/959,691, mailed May 12, 2014.
Notice of Allowance in U.S. Appl. No. 12/959,691, mailed Oct. 22, 2014.

* cited by examiner

SECURITY APPARATUS

REFERENCE TO A PRIOR APPLICATIONS

This application is a continuation of U.S. patent application Ser. No. 12/959,691, filed Dec. 3, 2010 entitled "Security Apparatus" which claims the benefit of U.S. Provisional Application No. 61/266,782, filed Dec. 4, 2009 and U.S. Provisional Application No. 61/286,526, filed Dec. 15, 2009, all of which are hereby incorporated by reference in their entirety.

FIELD OF THE INVENTION

The present invention relates to the field of access control systems.

BACKGROUND OF THE INVENTION

RFID card and reader systems are well-known in the field of access control. In a typical system, a reader is mounted beside each door to be secured.

SUMMARY OF THE INVENTION

Apparatus for use with an RFID proximity card and with a steel door and frame assembly forms one aspect of the invention. This apparatus comprises a sensor assembly which produces a first signal when the card is operatively presented thereto and which is adapted to be mounted in the frame in the manner in which a magnetic door contact is mounted.

Forming another aspect of the invention is apparatus for use with an RFID proximity card and with a steel door and frame assembly, the frame having a bore defined therein of the type in which a magnetic door contact can be mounted. This apparatus comprises a sensor assembly which produces a first signal when the card is operatively presented thereto and which, in use, is received by the bore and grippingly engages said frame.

Forming another aspect of the invention is apparatus for use with an RFID proximity card and with a steel door and frame assembly, the door having a magnet and the frame having a bore, which, when the door is closed in the frame, presents towards the magnet, the bore being of the type provided to permit the mounting of a magnetic door contact in the frame. This apparatus comprises a sensor assembly which: in use, is received by the bore and grippingly engages said frame; produces a first signal when the card is operatively presented thereto; and produces a second signal when the door is closed to bring the magnet adjacent the sensor assembly and into alignment with the bore.

According to another aspect of the invention, the sensor assembly, in respect of any of the apparatuses, in use, can cover the bore.

According to another aspect of the invention, the sensor assembly, in respect of any of the apparatuses, can have annular ribs which provide for said gripping engagement of the frame.

According to another aspect of the invention, the card can be presented to the sensor assembly to produce the first signal when the door is closed by sliding the card between the magnet and the sensor assembly via the slot between the door and the frame.

Advantages of the invention will become apparent to persons of ordinary skill in the art upon review of the appended claims and upon review of the following detailed description of an exemplary embodiment of the invention.

DETAILED DESCRIPTION

Figure 1:
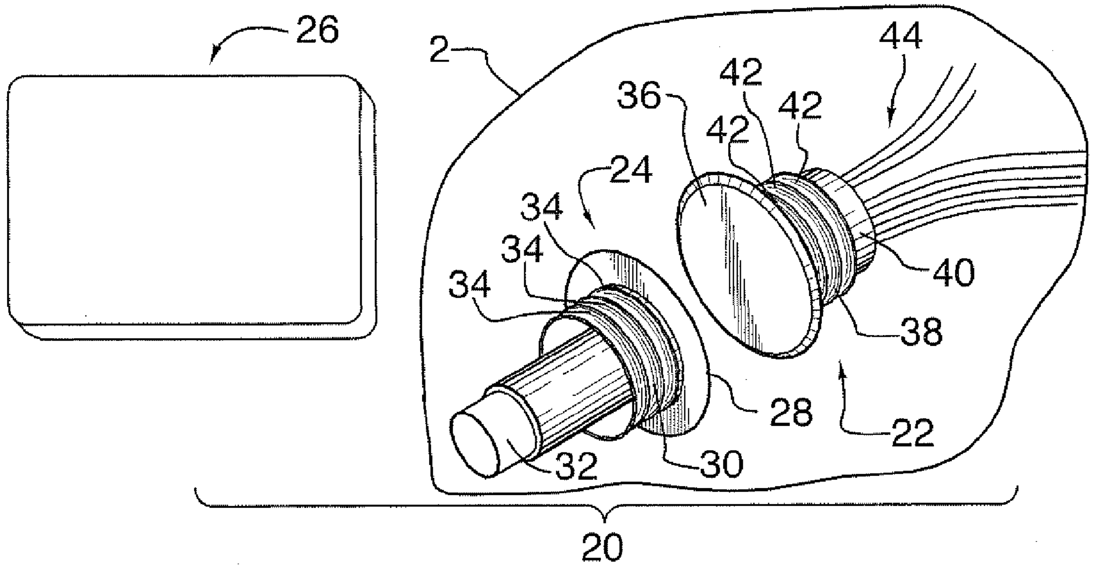
FIG. 1 shows the components of an access control system according an exemplary embodiment of the invention.

Shown in FIG. 1 is a sensor assembly 22, a magnet assembly 24 and a RFID proximity card 26, which collectively form the components of an access control system 20.

The magnet assembly 24 is of a conventional type and will be seen to include a generally planar disc 28 portion, a hollow cylindrical portion 30 extending coaxially from the disc portion 28 and a permanent magnet 32 disposed within and extending coaxially to the cylindrical portion 30. Cylindrical portion 30 has a series of annular ribs 34, also arranged coaxially with the disc portion 28 and has a nominal 1" diameter.

The sensor assembly 22 will be seen to include a generally planar disc portion 36, a hollow cylindrical portion 38 extending coaxially from the disc portion 36 and a sensor 40 disposed within and extending coaxially to the cylindrical portion 38. The cylindrical portion 38 has a series of annular ribs 42, also arranged coaxially with the disc portion 36. Cylindrical portion 38 has a nominal 1" diameter. The sensor 40 has a 9-conductor lead 44 extending therefrom. Three of the conductors emanate from a magnetic switch (not shown) which forms part of the sensor 40. The other six conductors emanate from a Wiegand-format RFID reader (not shown) which forms part of the sensor 40. But for their shape and packaging in the cylindrical portion 38, both the magnetic switch and reader are of conventional construction and as such, construction details are neither required by persons of ordinary skill nor provided herein.

With further regard to the terms of the shape and packaging of these components, it will be understood that, in the illustrated embodiment, the sensor assembly of the present invention takes the form of the contact switch part of General Electric Steel Door Contact Model No. 1076, and the magnet assembly of the present invention is one and the same as the magnet part of General Electric Steel Door Contact Model No. 1076.

Figure 2:
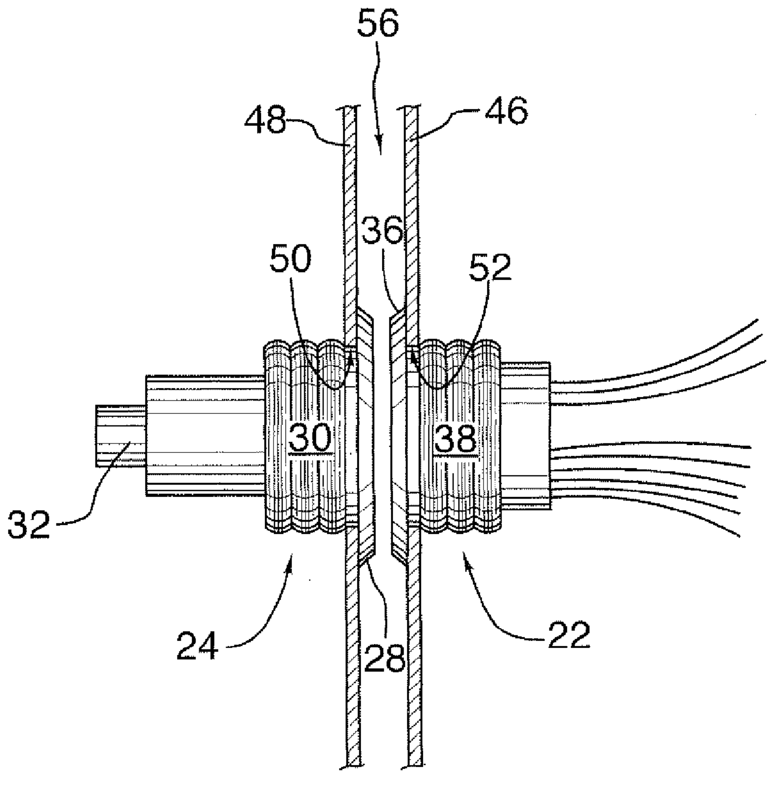
FIG. 2 shows the components in encircled area 2 of FIG. 1 in use.

FIG. 2 is a partial sectional view showing the structure in encircled area 2 of FIG. 1 in use with a steel door and frame assembly.

With initial reference to the steel door and frame assembly, which forms no part of the invention, illustrated structure 48 is part of the steel plate which forms the edge of the door, opposite to its hinges, and illustrated structure 46 is part of the steel plate that defines the innermost surface of the door jamb. Structures 46 and 48 are illustrated as they appear with the door closed in the frame.

Turning now to the remaining structure of FIG. 2 it will be noted that, in each of structures 46 and 48 there is defined a bore 52,50, the bores 50,52 being arranged to present towards one another.

The magnet assembly 24 is disposed in the door in a conventional manner, that is, the annular ribs 34 of the cylindrical portion 30 thereof grippingly engage the frame 48 and the planar portion 28 thereof conceal the bore 50.

The sensor assembly 22 is mounted in the frame in the same manner as that in which the magnet assembly is mounted in the door.

Surprisingly, notwithstanding the relatively small cross-section of the sensor assembly 22, i.e. notwithstanding the relatively small area of the antenna thereof (not shown, but understood to be positioned to substantially occupy disc portion 36), and the metal construction of the door frame, which tends to defeat RF transmission, when the sensor assembly 22 is operatively mounted as indicated above and coupled into an access control system in a conventional manner (not shown):

- with the door closed in the frame, the RFID reader produces a first signal when the card 26 is operatively presented to the sensor, namely, by sliding (not shown) the card 26 between the magnet assembly 24 and the sensor assembly 22 via the slot 56 between the door and the frame; and
- as the door is closed, to bring the magnet assembly 24 adjacent the sensor assembly 22 and into alignment with the bore 52, the magnetic switch produces a second signal.

It will be evident that this system has numerous advantages:

- it permits an RFID reader to be operatively mounted proximal to a door in an unobtrusive fashion;
- it avoids the need for a wall mount for an RFID reader; and
- it requires no specialized tools and is easily installed on a retrofit basis.

Whereas but a single exemplary embodiment is illustrated, variations are possible.

For example, whereas the exemplary embodiment employs a magnetic switch, this functionality could readily be avoided, i.e. the magnet assembly could be avoided altogether.

As well, whereas the device described has a 1" nominal diameter, other diameters, for example, ¾" nominal diameter could readily be substituted.

Further, whereas a specific part number is indicated hereinabove, this is the exemplary embodiment, only.

Yet further, whereas a 9 wire conductor is specified, this is merely for convenience only, to permit usefulness of the exemplary device with conventional 6-conductor Wiegand systems and conventional 3-conductor magnetic contact switch arrangements. As but one alternative, a single three-wire conductor could be utilized, on which the first and second signals could be multiplexed at the sensor assembly and demultiplexed at the controller.

Accordingly, the invention should be understood as limited only by the accompanying claims, purposively construed.

The invention claimed is:

1. An apparatus for access control comprising:

a sensor assembly including an antenna and a magnetic door contact, the sensor assembly configured to mount in a frame assembly for a door such that said antenna and said magnetic door contact present toward said door when said door is closed in said frame assembly, said sensor assembly configured to produce a first signal when an RFID proximity card is presented to said sensor assembly in a slot formed between said door and said frame assembly.

2. The apparatus of claim 1 further comprising, said antenna configured to couple with an RFID reader.

3. The apparatus of claim 2, wherein said sensor assembly includes said RFID reader.

4. The apparatus of claim 1, wherein the sensor assembly is a component of an access control system.

5. The apparatus of claim 1, wherein said magnetic door contact is configured as a disc portion coupled with a cylindrical portion.

6. The apparatus of claim 5, wherein said cylindrical portion includes one or more annular ribs.

7. The apparatus of claim 5, wherein said antenna is coupled with said disc portion.

8. The apparatus of claim 6, wherein said one or more annular ribs are configured to grippingly engage said frame assembly.

9. The apparatus of claim 1, wherein said sensor assembly is configured to mount within a recess defined by said frame assembly.

10. The apparatus of claim 9, wherein said sensor assembly is configured to cover the recess.

11. The apparatus of claim 4, wherein said sensor assembly is coupled with said access control system through six conductors.

12. A system for access control comprising:

a sensor assembly including an antenna and a magnetic door contact, the sensor assembly configured to mount in a frame assembly for a door, said sensor assembly configured to produce a first signal when an RFID proximity card is presented to said sensor assembly in a slot formed between said door and said frame assembly; and a magnet assembly configured to mount in said door of said frame assembly such that said magnet assembly presents toward said sensor assembly when said door is closed in said frame assembly.

13. The system of claim 12 further comprising, said antenna configured to couple with an RFID reader.

14. The system of claim 13, wherein said sensor assembly includes said RFID reader.

15. The system of claim 12, wherein said magnetic door contact is configured as a disc portion coupled with a cylindrical portion.

16. The system of claim 15, wherein said cylindrical portion includes one or more annular ribs.

17. The system of claim 15, wherein said antenna is coupled with said disc portion.

18. The system of claim 16, wherein said one or more annular ribs are configured to grippingly engage said frame assembly.

19. The system of claim 12, wherein said sensor assembly is configured to mount within a recess defined by said frame assembly.

20. The system of claim 19, wherein said sensor assembly is configured to cover said recess.

* * * * *